May 17, 1966 W. L. HUGHES ET AL 3,252,094

METHOD OF PROVIDING DOUBLE SIDE BAND SUPPRESSED CARRIER TRASMISSION SIGNAL

Filed May 28, 1962

2 Sheets-Sheet 1

INVENTORS
WILLIAM L. HUGHES
JACK M. WALDEN
DELBERT WHITMER

Head & Johnson
ATTORNEYS

May 17, 1966 W. L. HUGHES ET AL 3,252,094

METHOD OF PROVIDING DOUBLE SIDE BAND SUPPRESSED CARRIER TRASMISSION SIGNAL

Filed May 28, 1962 2 Sheets-Sheet 2

INVENTORS
WILLIAM L. HUGHES
JACK M. WALDEN
DELBERT WHITMER

Head & Johnson

ATTORNEYS

United States Patent Office 3,252,094

Patented May 17, 1966

3,252,094

METHOD OF PROVIDING DOUBLE SIDE BAND SUPPRESSED CARRIER TRANSMISSION SIGNAL

William L. Hughes and Jack M. Walden, Stillwater, Okla., and Delbert O. Whitmer, Boone, Iowa, assignors to Oklahoma State University of Agriculture & Applied Science, Stillwater, Okla., a corporation of Oklahoma Filed May 28, 1962, Ser. No. 198,015

2 Claims. (Cl. 325—138)

This invention relates to a transmission system. More particularly, this invention relates to an improved system of transmitting information, such as a television signal. Still, more particularly, the invention relates to a modified carrier transmission system having improved signal to noise performance and reduced co-and-adjacent channel interference characteristics.

There are many ways of transmitting television signals. The method customarily used is that of simple amplitude modulation with full carrier and suppressed side band. Experiments have been conducted towards a proposed transmission system utilizing suppressed carrier. The disadvantage of the suppressed carrier system is that it is necessary to send some sort of carrier information for later demodulation purposes. The advantages of the suppressed carrier transmission system are that interference between stations is reduced considerably, but this advantage is offset by the disadvantage that when suppressed carrier is utilized the receiver must have some sort of carrier extraction technique which depends on a pilot carrier usually sent as a synchronizing interval burst.

This invention provides a transmission system having the advantages of suppressed carriers, but in a means not requiring a pilot carrier.

In the transmission system of this invention the carrier is suppressed providing the advantage that interference between stations is reduced and providing the further advantage that for any given amount of transmitter power a much higher percentage of the energy is in the side bands and therefore the signal to noise performance is improved but in a manner wherein it is not necessary to send any type of pilot carrier or synchronizing energy bursts.

It is therefore one object of this invention to provide a transmission system having improved characteristics of reduced interference between co-and-adjacent channels.

Another object of this invention is to provide a transmission system having the advantage that for any given amount of transmitter power a much higher percentage of the energy is concentrated in the side bands and therefore the signal to noise performance of the receiver system is much improved for any given environment.

Another object of this invention is to provide a transmission system utilizing suppressed carrier in a means whereby a minor carrier component is retained which may be utilized for later demodulation purposes obviating the necessity of transmitting a supplementary demodulation burst.

These and other objects and a better understanding of the invention may be had by referring to the following description and claims taken in conjunction with the attached drawings in which:

This invention may be described as an improved modified carrier transmission system. More particularly, but not by way of limitation, the invention may be described as a method of providing a transmission signal for transmitting electrical signal information such as a video signal comprising the steps of inverting said video signal to obtain two substantially identical video modulating signals at substantially 180° phase relationship, generating a transmission carrier signal, inverting the carrier signal to obtain two substantially identical carrier signals at substantially 180° phase relationship, modulating one of said obtained carrier signals with one of said obtained video modulating signals and, in like manner, modulating the other of said obtained carrier signals with the other of said obtained video modulating signals, and adding the two modulated carrier signals to obtain a transmission signal.

Figure 1:
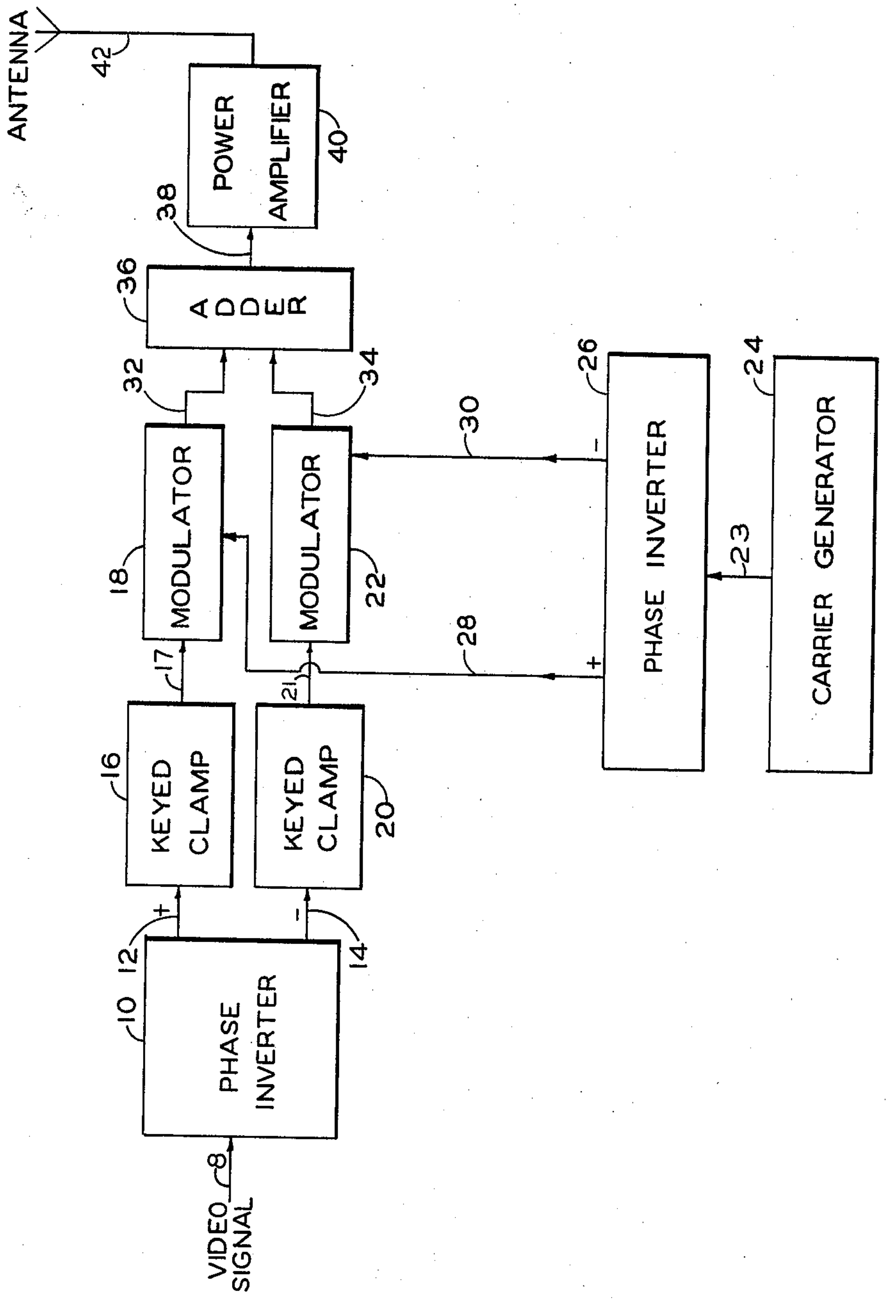
FIGURE 1 is a block diagram of a transmitter system incorporating the principles of this invention.

Referring now to the drawings, and first to FIGURE 1, a block diagram of a transmitter system adaptable to transmit a television signal is shown.

A video signal 8 is introduced into the transmitter. Video signal 8 is of a character normally available from a television camera, after having undergone treatment necessary to add synchronization pulses, audio signals and other information necessary to recreate at the receiver the complete video picture. Video signal 8 is fed first to a phase inverter 10. The output of phase inverter 10 is a positive or in-phase video signal 12 and a negative or inverse phase video signal 14. The in-phase signal 12 is substantially identical to the video signal 8 and is fed through a keyed clamp circuit 16 to provide a clamped in-phase video signal 17, which in turn, is fed to a first modulator 18. The inverse or minus video signal 14 is fed from phase inverter 10 through a keyed clamp circuit 20 forming a clamped inverse video signal 21 which is fed to a second modulator 22.

An obvious alternate circuit arrangement would be to feed keyed clamp circuit 16 directly with a portion of video signal 8 and inverting the other portion of video signal 8 to form the inverse video signal 14 to feed keyed clamp circuit 20. Keyed clamp circuit 16 functions as a D.C. restorer to establish the level of the clamped video signal 17. Keyed clamp circuit 20 functions in the same way to provide clamped inverse video signal 21, except that in this case signal 21 is clamped in a negative manner.

A carrier signal 23 is provided by carrier generator 24 and is fed to a carrier phase inverter 26. The output of the carrier phase inverter 26 provides two signals, the first being a plus or in-phase carrier signal 28 which is fed to first modulator 18 and a minus or inverse phase carrier signal 30 which is fed to second modulator 22.

Another obvious alternate circuit arrangement would be to feed first modulator 18 directly with a portion of carrier signal 23 and invert the other portion of the carrier signal 23 to provide the minus or inverted carrier signal 30.

The output 32 of first modulator 16 and the output 34 of second modulator 22 are fed to an adder circuit 36. The two modulated signals 32 and 34 are combined in the usual function of adder 36 to provide a balanced modulated output signal 34, which, after the energy level is raised in power amplifier 40, may be fed to an antenna 42.

The method of providing a transmission system of this invention as diagramed in FIGURE 1 can best be understood by a mathematical analysis of a video signal as it progresses through the transmitter. The generalized expression for a video signal of a television picture is:

$$E_{video}=K_0+\sum_{n=1}^{\infty}K_n \cos (n\omega_v t+\phi_n)$$

In this equation the term "$K_0$" represents the D.C. component which is always present in a television picture, and which is stabilized in the modulated signal by the keyed clamp circuits 16 and 20. The infinite summation indicates all of the non-zero frequency components in the picture signal.

$K_n$ is the coefficient of each time varying harmonic, N represents each even and odd harmonics, thus 1, 2, 3, 4, etc., and $\omega_v t$ equals the horizontal line frequency (15,750 c.p.s.) in radians. This generalized mathematical expression ignores the field rate side bands on each one of the horizontal line rate side bands, but the expression is close enough for general analytical purposes. By the expression "D.C. component" is meant that the light from a scanned TV picture has an average value which is greater than zero and which never has a value less than zero. The expression further means that in a TV picture there is always some modulation except from a seldom encountered perfectly black picture.

With carrier generator 24 providing a carrier frequency of $\omega_c$ the output 32 of modulator 18 will have a generalized equation as follows:

$$E_{1_{\text{modulated}}}=(1+mE_{\text{video}})\cos\omega_c t=$$
$$\left(1+m\left[K_0+\sum_{n=1}^{\infty}K_n\cos(n\omega_v t+\phi_n)\right]\right)\cos\omega_c t$$

In similar manner the mathematical expression for the output 34 of modulator 22 will be as follows:

$$E_{2_{\text{modulated}}}=$$
$$\left(1-m\left[K_0+\sum_{n=1}^{\infty}K_n\cos(n\omega_v t+\phi_n)\right]\right)(-\cos\omega_c t)$$

As has been previously mentioned, in modulator 22 the video is also clamped, only in this case it is clamped in a negative manner. To determine the output signal 38 the mathematic effect of adder 36 can be obtained by multiplying the expressions of the equation for $E_1$ and the equation for $E_2$ and then adding them. The results are as follows:

$$E_{\text{adder output}}=2mK_0\cos\omega_c t+$$
$$2m\sum_{n=1}^{\infty}K_n\cos(n\omega_v t+\phi_n)\cos\omega_c t$$
$$=2mK_0\cos\omega_c t$$
$$+m\sum_{n=1}^{\infty}K_n\cos[(\omega_c+m\omega_v)t+\phi_n]$$
$$+m\sum_{n=1}^{\infty}K_n\cos[(\omega_c-m\omega_v)t-\phi_n]$$

The mathematical expression of the output 38 of adder 36 indicates that there are extensive side bands produced but that there is also a significant carrier component, even though the system is a balanced modulator. In other words, major components of carrier do cancel but a minor carrier component due to the D.C. video component still remains. This minor component of carriers is always present except in a perfectly black picture, which as has been previously described, is seldom or never encountered in video broadcasting, and therefore the output signal does provide information sufficient for later decoding purposes by the utilization of a receiver having the circuit arrangement of FIGURE 2, to be described subsequently.

As indicated in the expression for the output signal 38, the modulated signal may be termed a suppressed carrier double side band signal. The side bands may be vestigial, that is, each of the side bands may be partially attenuated so that the overall band width required to transmit a video signal, is equal to or less than the present six megacycle band width established as the television standards by the NTSC.

Figure 2:
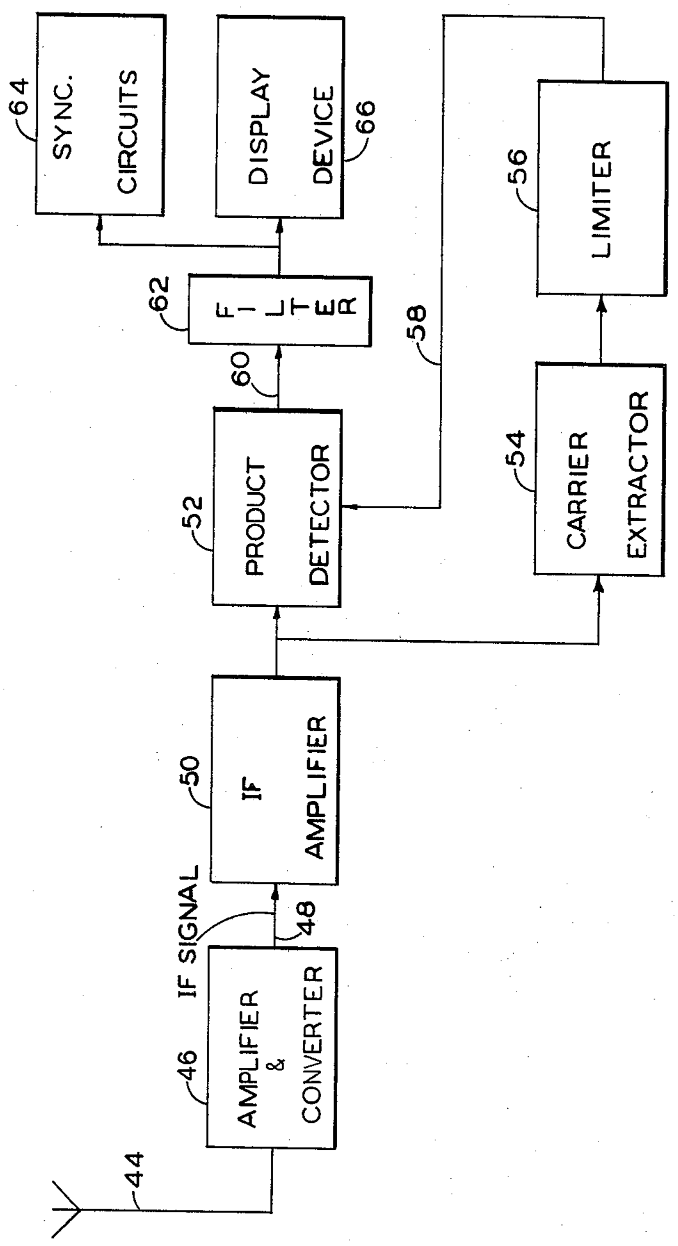
FIGURE 2 is a block diagram of a receiver as utilized to receive and decode a transmitted signal from the transmitter system of FIGURE 1.

Referring to FIGURE 2 the receiver antenna 44 receives energy as broadcast by transmitter antenna 42. The received signal is conducted through a conventional tuned amplifier and converter 46 to provide an IF output signal 48. The output from IF amplifier 50 is split, a first portion going directly to a product detector 52 and a second portion is fed to a tuned filter carrier extractor 54. The carrier is extracted from the IF signal and after passing through limiter 56 the carrier signal 58 is returned to product detector 52. Limiter circuit 56 eliminates any amplitude fluctuations of the extracted carrier signal so that a constant amplitude carrier 58 is fed to product detector 52. The extracted carrier signal 58 is utilized in the product detector 52 to produce the received video signal at 60. The output 60 of the product detector 52, after passing through proper filter 62 may be fed to synchronous circuits 64 and display component 66 as found in a typical television receiver.

This invention provides a modified carrier transmission system having the advantage that interference between co-and-adjacent broadcast channels is considerably alleviated. Still another advantage is that for any given amount of transmitter power a much higher percent of the transmitted energy is concentrated in the side bands and therefore the signal to noise ratio performance of the transmission signal is greatly improved in any given transmission environment.

This invention has been particularly described as it is applied to the broadcast and receipt of television picture signals. The transmission system of this invention is much wider in its application and the use of the system for the transmission of television signals, is set forth as an example of the application of the invention, and not as a limitation. Factors of co-channel and adjacent channel interference and signal to noise ratio will become increasingly important as advancements are made to expand television to overseas broadcasting and will be especially significant in satellite and interplanetary transmission.

This invention has been described in a certain degree of particularlity but it is manifested that many changes may be made in the details of construction and the arrangement of components without departing from the spirit and scope of this disclosure.

We claim:

1. A method of providing a transmission signal for transmitting electrical signal information such as a video signal, comprising the steps of:

inverting a portion of said video signal to obtain an inverse video signal at substantially 180° phase relationship;

positively key clamping said video signal and negatively key clamping said inverse video signal;

generating a transmission carrier signal;

inverting a portion of said carrier signal to obtain an inverse carrier signal at substantially 180° phase relationship;

modulating said carrier signal with said clamped video signal;

modulating said inverse carrier signal with said inverse clamped video signal; and adding the modulated carrier signals to obtain a transmission signal.

2. A method of providing a transmission signal for transmitting electrical signal information such as a video signal, comprising the steps of:

inverting a portion of said video signal to obtain an inverse video signal at substantially 180° phase relationship;

negatively key clamping said video signal and positively key clamping said inverse video signal;

generating a transmission carrier signal;

inverting a portion of said carrier signals to obtain an inverse carrier signal at substantially 180° phase relationship;

modulating said carrier signal with said clamped video signal;

modulating said inverse carrier signal with said inverse clamped video signal; and adding the modulated carrier signals to obtain a transmission signal.

References Cited by the Examiner

UNITED STATES PATENTS

| | | | |
|---|---|---|---|
| 1,831,516 | 11/1931 | Stewart | 332—42 |
| 2,210,968 | 8/1940 | Wirkler | 332—45 |
| 2,276,863 | 3/1942 | Peterson | 325—329 |
| 2,317,071 | 4/1943 | Luck | 325—138 |

| | | | |
|---|---|---|---|
| 2,566,876 | 9/1951 | Dome | 325—137 |
| 2,992,326 | 7/1961 | Kahn | 325—329 |
| 3,071,643 | 1/1963 | Matthews | 179—15 |

FOREIGN PATENTS

| | | |
|---|---|---|
| 621,063 | 4/1940 | Great Britain. |

DAVID G. REDINBAUGH, *Primary Examiner.*

J. W. CALDWELL, *Assistant Examiner.*